Hirosuke Yumoto
Kazuya Harada
Masaaki Itoga
INVENTORS

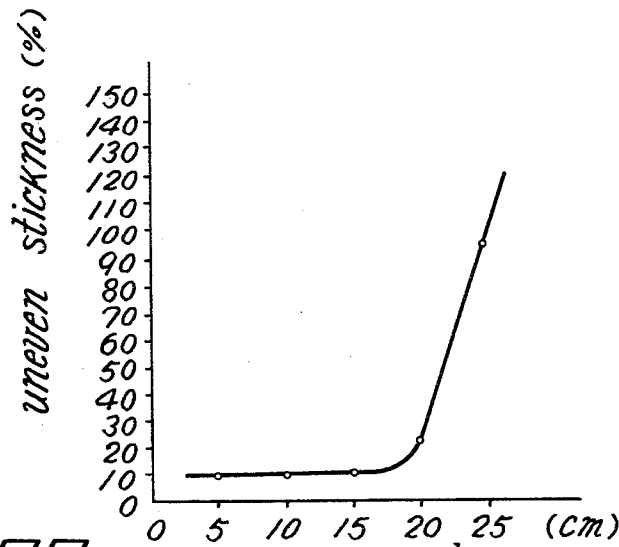
FIG.8. average radiation breadth
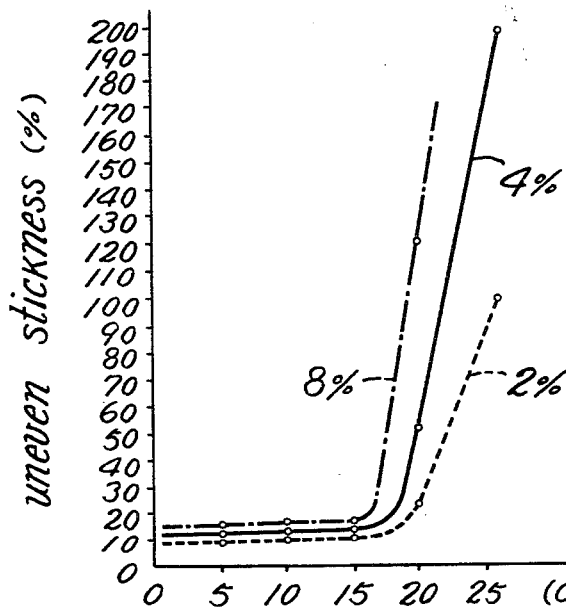
FIG.9. average radiation breadth

United States Patent Office 3,396,216
Patented Aug. 6, 1968

3,396,216
PROCESS FOR STRETCHING POLYPROPYLENE FILM
Hirosuke Yumoto, Kazuya Harada, and Masaaki Itoga, Mishima-shi, Japan, assignors to Toyo Rayon Kabushiki Kaisha, Tokyo, Japan
Continuation of abandoned application Ser. No. 269,368, Apr. 1, 1963. This application July 11, 1966, Ser. No. 565,358
Claims priority, application Japan, Apr. 14, 1962, 37/14,989, 37/14,990; May 18, 1962, 37/19,704
2 Claims. (Cl. 264—25)

ABSTRACT OF THE DISCLOSURE

A process for stretching polypropylene film in a transverse direction which includes subjecting it to a diagonally disposed localized irradiation restricted to a radiation area having an average radiation breadth of about 10–200 mm. The average temperature of the film inside the radiation area is at least about 7° C. higher than the average temperature of the film prior to entering the radiation area.

---

This application is a continuation of applicants' copending application, Ser. No. 269,368, filed Apr. 1, 1963, now abandoned.

This invention relates to stretching polypropylene film in the transverse direction so as to significantly reduce unevenness in thickness.

When a polyamide or polyester film already stretched in one direction is stretched in the direction normal thereto or in the transverse direction, it is known that stretching the film by uniformly heating it with hot air can be performed effectively. However, when polypropylene film is similarly stretched by heating at a temperature below its melting point while holding opposite edges thereof, the film will usually be constricted and will be divided into stretched and unstretched parts. Hence, if the constricted part is not stretched under proper conditions, such a process will result in the formation of a film having a considerably uneven thickness. This is particularly true when the polypropylene film has first been stretched in the longitudinal direction before stretching in the normal or transverse direction.

To overcome the foregoing difficulties in consecutively stretching a film of crystalline polyolefin in the longitudinal and transverse directions at a temperature below its melting point, the present inventors have previously proposed gradually stretching the film in such a way that stretching takes place in the constricted portion only to thereby prevent excessive orientation of the stretched part and at the same time stretch the whole film uniformly. Said inventors have filed a patent application for this process, Ser. No. 178,865, filed Mar. 12, 1962, now abandoned. The present invention relates to a similar process for stretching of film with heat but incorporates improvements to eliminate or substantially reduce uneven thickness in the stretched films.

Thus, it has been found that when stretching a polypropylene film in the transverse direction, unevenness in thickness for the resulting stretched film can be eliminated or substantially reduced if the film is uniformly stretched by localized heating under conditions so chosen that (1) an average radiation breadth for the localized heating or radiation zone is within the range 10 mm. and 200 mm. and (2) the average temperature of the film in the radiation zone (stretch temperature) is higher by at least 7° C. than the average temperature of the film at the boundary line for the radiation zone (the radiation marginal line) on the supply side.

Further, it has been found that an improved thickness character results when stretching the film in the transverse direction, if the amount of heat received by the film along the direction of the length of the heater is decreased in such a manner that the amount of heat absorbed by the film at the part where stretching is completed is 10% less than the amount at the part where stretching is started.

Still another feature of the invention resides in the discovery that the thickness character of the film can be enhanced by decreasing the average film temperature along the length of the radiation marginal line on the supply side of film in such a manner that the temperature at or near stretch completion is lower by more than 3° C. than at the beginning stage of stretching.

A principal object of the present invention is to decrease unevenness in thickness for polypropylene films stretched in the transverse direction. British patent specification No. 753,603 describes a process for stretching films in the transverse direction. However, it has been found that in applying the prior British technique in stretching of polypropylene certain requirements which are not involved in application to other resins must be satisfied.

British patent specification No. 753,603 makes no mention of an average radiation breadth and specifies "linear heating." However, upon carrying out experiments on polypropylene film, it has been found that to the contrary uniform stretching is not possible with an average radiation breadth of less than 7 mm., and a high degree of unevenness in thickness is encountered for an average radiation breadth of less than 10 mm. At the other end, it has been found that no adverse influence will result from average radiation breadths up to about 200 mm. Such has nullified the definition of "linear." It has been also found that even if the average radiation breadth is within the limit of above 10 mm. and below 200 mm., the differential ($\Delta T$) between the film stretch temperature and the average temperature on the radiation marginal line on the supply side of film should be more than 7° C.

When other resin films, for example polyethylene terephthalate film, are stretched with the average radiation breadth below 7 mm., $\Delta T$ is effective enough at more than 2° C. It can be regarded as an embodiment of the principle of the specification of British Patent No. 753,-603. Further through studying other resins, not only was the 7° C. limit not found proper, but also no sharp change was found which could be termed as a marginal phenomenon.

The present invention is based upon findings applicable to polypropylene, an isotactic polymer having entirely different characteristics from other known polymers, that there exists clearly defined and critical conditions unforeseeable from prior knowledge necessary for its industrialization.

In a tenter type stretcher which is applied as a breadth direction stretcher in the present invention, infra-red ray heaters of L-type, V-type, straight type, and reverse V-type arranged in the breadth direction of the film are utilized effectively.

The following types or arrangements of infra-red ray heaters may be used in carrying out the method of the present invention.

(I) A heater provided with a screening plate for the heat rays, which has adjustable apertures disposed at intervals, and the slit gap of the screen plate is adjustable or the corelationship between the infra-red ray heater and film is adjustable.

(II) An arrangement wherein several heaters of different heating capacities are disposed in a straight line or the temperatures of heaters composed of a multiple of sections are individually adjustable.

(III) A heater which is provided with a reflection panel, the shape of the reflection panel being different along the length of the heater or the reflection rate of the reflection plate is properly changed or the reflection panel is gradually closed.

(IV) A heater wherein a heat absorber, e.g., a spiral tube, is provided in the direction of the length of the circumference of the heater.

While the heaters which may be used in carrying out the present invention are most preferably infra-red heaters because of their convenience in temperature control and maintenance, similar results can be accomplished by the use of hot air heaters wherein the ejection amount is adjustable or temperature is adjustable by ejection of gas of different temperature.

The invention will now be more fully described by reference to accompanying drawings and charts which are a part hereof and wherein:

FIGS. 8, 9 and 10 are graphs showing the relation between average radiation breadth and unevenness in thickness, as observed in Examples 1, 2 and 3, respectively, described hereinafter;

Figure 12:
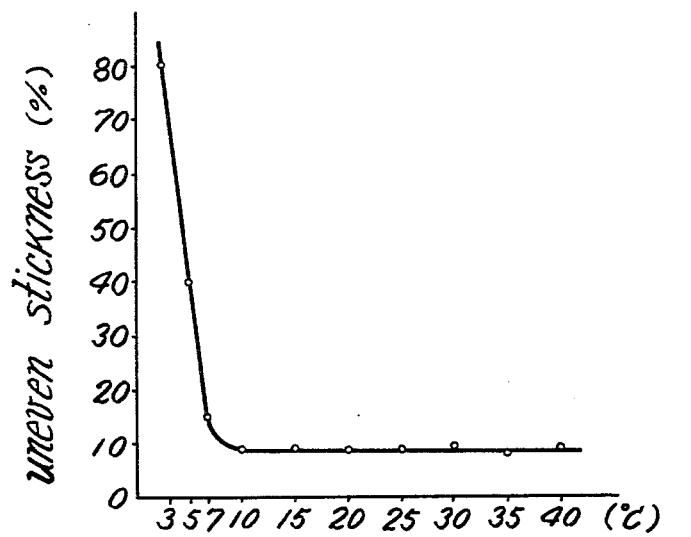
Figure 11:
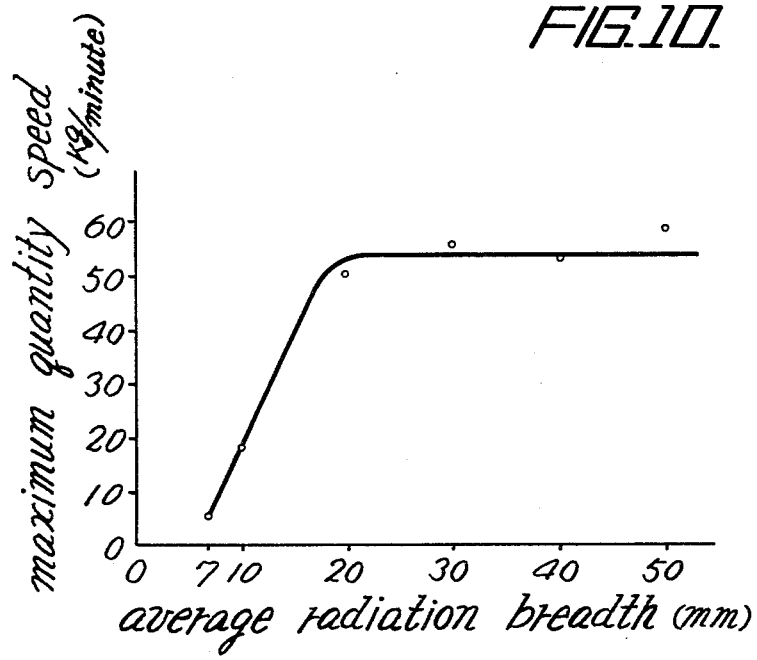

FIG. 11 is a graph showing the relation between average radiation breadth and maximum mass speed as observed in Example 4 described hereinafter; and, FIG. 12 is a graph showing the relation between the degree of unevenness in thickness and changes in the temperature difference between the stretching temperature and the average temperature along the radiation marginal line on the supply line of the radiation zone as observed in Example 5 described hereinafter.

Figure 1:
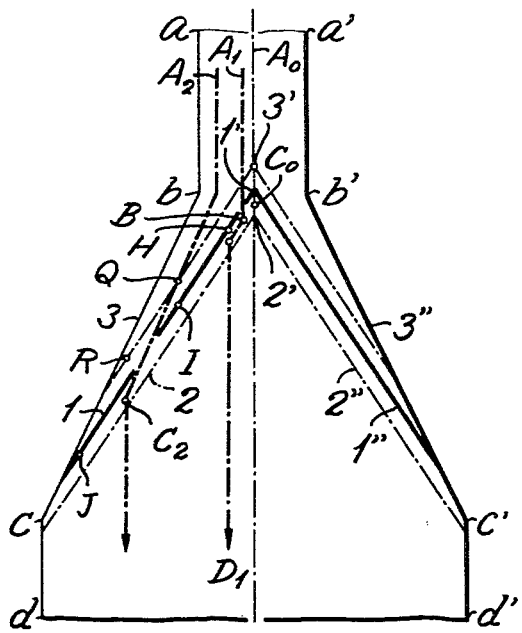
FIG. 1 is a schematic plan view of a synthetic resin film being stretched in the transverse direction in accordance with the process of the invention.
Figure 2:
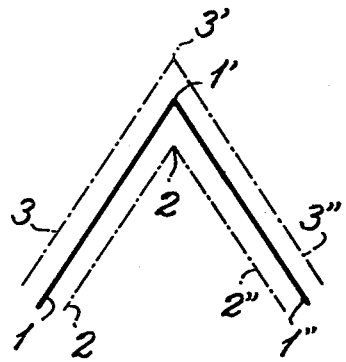
FIG. 2 is a detail of a part of FIG. 1.

Referring to FIG. 1, a film which has been stretched in the longitudinal or extrusion direction begins with breadth $a-a'$, is stretched in a direction transverse to the direction of movement starting at $b-b'$ and completed at $c-c'$, and the stretched film then proceeds to $d-d'$ with a fixed breadth. It is heated with an infra-red ray heater which is placed so that, in the transverse stretching zone, the center line of the heater is along the lines $1-1'-1''$ in FIGS. 1 and 2. The heater can be adjusted so that the actual breadth of the belt-shaped zone of the film being heated can be varied by screening the infra-red ray heater, by providing a ray-collecting system, by various reflection plates or by using only a part of the heat rays. The radiation breadth is defined by the lines $2-2'-2''$ and $3-3'-3''$, and the radiation zone is defined as the area enclosed by the lines $2-2'-2''$ and $3-3'-3''$ in FIGS. 1 and 2. The radiation marginal lines are represented by the lines $2-2'-2''$ and $3-3'-3''$, and the radiation marginal line on the supply side of film is $3-3'-3''$.

Figure 3:
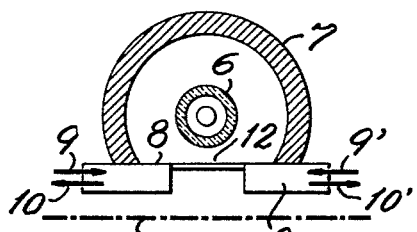
FIGS. 3 and 4 are diagrammatic cross sections of infra-red ray heaters, FIG. 4 showing an embodiment of heater arrangement for preliminary experiment.

FIG. 3 is a side view, in section, of an infra-red ray heater for preheating and stretching film mounted on a film stretching apparatus. It is provided with an infra-red ray heating element 6, a reflection plate 7, screening plate 8, and cooling medium feed and exhaust pipes 9, 9', and 10, 10' respectively. The infra-red ray heater is shown disposed above a polypropylene film 11.

On the upper half of the infra-red ray heater 6 is mounted the reflection plate 7 which comprises a plurality of curved reflecting plates joined together. The reflecting plate 7 rests on the screening plate 8, which is provided with an adjustable slit 12 disposed opposite the heating element 6. The important features of the infra-red ray heater for use in the present invention are the cooling of the screening plate 8 by a cooling medium and the adjustability of the slit 12. In the heater, constructed as above described, the screening plate 8 never becomes heated. Therefore, there is no heat radiation from this part, and because the slit 12 in the screening plate 8 is adjustable, it is possible to heat a linear or belt-like area of the film.

Figure 4:
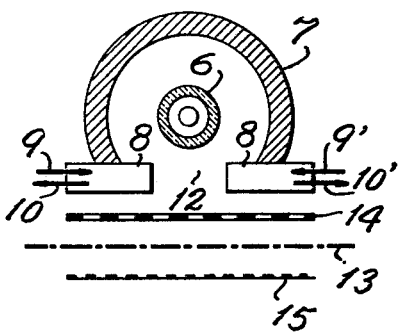

In a preliminary experiment the apparatus shown in FIG. 4 was used. A polypropylene film 13, which had been stretched in the extrusion direction to four times its original size to a thickness of 200 microns, was fastened on a film carrying surface. A polyethylene terephthalate film 14, on which aluminum had been deposited by vacuum evaporation, was placed above the polypropylene film with the aluminum surface facing up toward the infra-red ray heater. The power of the infra-red ray heater was raised to a prescribed value and after thermal equilibrium had been attained, the film 14 was taken off for an instant. After exactly 3 seconds using an electronic timer, the tips of a temperature-measuring material 15, such as that sold under the trade name Tempilistic, which previously had been disposed 10 mm. below the polypropylene film, were simultaneously crimped, and, at the same time, the heat rays from the infra-red ray heating element 6 were cut off by replacing the film 14. In order to correct the temperature measurement made by the temperature-measuring material 15, the surface temperature of the film 13 which had been kept at a prescribed value was accurately measured by means of a thermister or thermocouple thermometer. Then, the same temperature was measured with the temperature-measuring material 15 so that measurements made with the latter could be corrected. The amounts of heat received by different areas of the film 13 were calculated.

Figure 5:
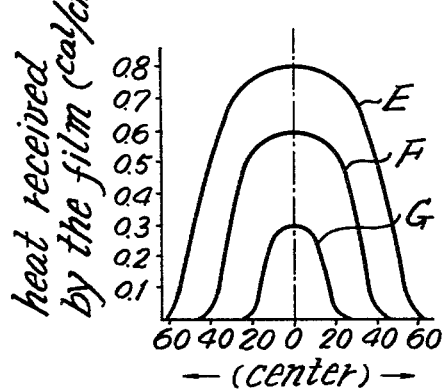
FIG. 5 is a diagram showing the relationship between radiation area and the amount of heat received by the film.

The results are shown in FIG. 5, in which curve E was obtained with an 80 mm. slit, curve F with a 40 mm. slit, and curve G with a 10 mm. slit. These curves are called the curves of the dissemination of the amount of heat. From the area enclosed by each curve and the abscissa axis, it is possible to calculate by graphic integral calculus the heat from a unit length of infra-red ray heater as well as the amount of heat received by film within a unit time. If the area enclosed by the curve G and the abscissae is regarded as unit area, it has been established that, with an increase in size of the slit, the areas enclosed by the curves F and E and the abscissae, respectively, become 4 times and 8 times larger. The shape of size of the dissemination curves differ according to the type, capacity and construction of the infra-red ray heater and the kind of reflection plate and the screening substance.

From FIG. 5, the radiation marginal lines can more accurately be defined with reference to the total film area being heated. The line identified as $1-1'-1''$ in FIGS. 1 and 2 corresponds to the line on the film which receives the maximum heat or the center in FIG. 5. The radiation marginal lines identified as $2-2'-2''$ and $3-3'-3''$ in FIGS. 1 and 2 fall one on each side of the maximum heat line and are defined as that along which the film receives exactly one-half the maximum heat. The radiation area which is bounded by the radiation marginal line is that area under radiation which is always receiving at least one-half (or more) of the maximum heat.

The average radiation breadth is defined as the average width of the radiation area, or the distance between the lines $2-2'-2''$ and $3-3'-3''$, at right angles to the center line $1-1'-1''$ of the radiation zone shown in FIG. 1.

The unevenness in thickness is measured in accordance with the formula:

$$\frac{\text{Maximum thickness} - \text{Minimum thickness}}{\text{Average thickness}} \times 100\%$$

(Continuously measured for a unit length of 100 cm.)

Consider point $A_1$ on the film shown in FIG. 1. It proceeds from $B_1$ to $C_1$ in parallel with $bc$, where stretching takes place at the maximum temperature, and then proceeds to $D_1$ in parallel with the extrusion direction of the film. In many cases $C_1$ is at a side close to the end of the radiation area. Likewise, considering $A_2$, it will be noted that stretching takes place at $C_2$. $A_0$ which is in the center is stretched at $C_0$. Thus, $C_0$, $C_1$, and $C_2$ are on a single straight line, and stretching takes place on this line. After passing the line 2–2′–2″, the temperature of the film is lowered below the level at which stretching can take place.

The present invention can be applied not only to the case where film previously stretched in the extrusion direction is stretched in the transverse direction, but also to the case where the above procedure is reversed.

The invention is further described and demonstrated by the following examples.

Example 1

Polypropylene of 98% isotacticity, obtained by an ether and n-heptane extraction process and having an intrinsic viscosity of 2.5 at 135° C. when dissolved in tetralin, was melted, extruded, and cooled. The resulting film was stretched to 4 times its original size in the extrusion direction to have a thickness of 100 microns and a breadth of 500 mm. and was then stretched to 4 times its original size in the transverse direction in the manner of FIG. 1. There was obtained a biaxially stretched film having a thickness of 25 microns and a breadth of 2000 mm.

In this example, the heater capacity and the screening plate were adjusted during the experiment so that the amount of heat on the film remained unchanged with variation of the radiation area. Before arriving at the radiation marginal line 3–3′–3″ on the supply side, the film was uniformly preheated by hot air to a temperature of 120° C. The experiment was with different average radiation breadth, namely 5 cm., 10 cm., 15 cm., 20 cm., and 25 cm.

It was observed that the unevenness in thickness of the film became suddenly magnified when the average radiation breadth exceeded 20 cm. and at 25 cm. the film would generally break due to such uneven stretching, thus making it almost impossible to continue with the stretching operation. The results are shown in FIG. 8.

Example 2

The same procedure as described in Example 1 was followed using samples of films stretched in the extrusion direction and already having 2, 4 and 8% unevenness. The results obtained are shown in FIG. 9. It will be noted that the curves have substantially the same trend as in FIG. 8, but a marked difference arises at high breadths according to the original unevenness of film before being stretched in the transverse direction. In every case, uniform stretching was possible with an average radiation breadth of less than 15 cm., but when the radiation breadth was in excess of 20 cm., the degree of unevenness would increase. Thus, when the radiation breadth was 20 cm., if the original thickness was 2% uneven, there was little uneven stretch, but at 4% initial unevenness, the unevenness would increase to a visible extent. With an 8% initial unevenness, completely irregular stretching occurred. With a radiation breadth of 25 cm., the increase in unevenness was even more noticeable.

In any event, it was found that there were unmistakable bending points at around 20 cm.

Example 3

Figure 10:
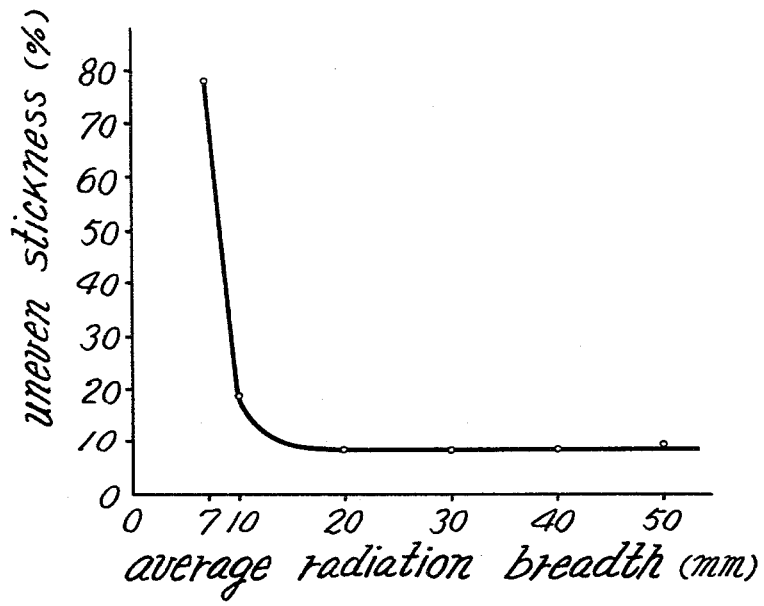

In a manner similar to that described in Example 1, experiments were carried out with average radiation breadths less than 50 mm., namely 50, 40, 30, 20, 10 and 7 mm. The experiments were performed with the preheating condition before the arrival of the film at the radiation marginal line 3–3′–3″ on the supply side being adjusted so as to keep the stretching temperature constantly at 155° C. With radiation breadths of 20 mm. and upwards, the transverse unevenness of the films obtained remained unchanged, but with a radiation breadth of 10 mm., the unevenness of the film increased slightly and with the 7 mm. radiation breadth, it increased greatly. The results obtained are shown in FIG. 10.

Example 4

In the same manner as described in Examples 1 and 3, experiments were carried out to determine the maximum mass speeds at which the stretching process could be conducted without increasing the degree of unevenness at various average radiation breadths. The value for the maximum mass speed differed slightly depending on whether the film was initially thick or thin, but there was no appreciable difference. The type of infra-red heater used, the type of reflecting plate, the type of device for screening part of the heat rays, and the conditions of preliminary heating were varied for each radiation breadth and the conditions which gave the best results, i.e. the highest maximum mass speeds, were plotted in a chart. The capacity of the infra-red ray heater used was 20 kw.

As will be noted from the results shown in FIG. 11, there was almost no change down to 20 mm. radiation breadth, but the maximum mass speed declined to 1.8 kg./min. with a radiation breadth of 10 mm. This value was considerably lower than the 2.7 kg./min. which were used in Examples 1 to 3. This agrees with the fact that the unevenness increases from 8% to 18% at 10 mm., as can be seen from FIG. 10. In other words, if the mass speed of 2.7 k./min. is reduced to below 1.8 kg./min., the process can be carried out with a radiation breadth of 10 mm. However, at a radiation breadth of 7 mm., the process can only be carried out with extremely low mass speeds, below 400 g./min.

In this connection, even if the capacity of the heater is doubled to 40 kw., the relationship in FIG. 11 is not improved for the lower range of the radiation breadth, i.e. 10 mm. and 7 mm.

On the basis of the foregoing described discoveries, it has been determined by the inventors that the preferred radiation breadth for transversely stretching polypropylene film in accordance with the present invention is about 80–100 mm.

Example 5

In Examples 1 to 4, the maximum and minimum limits for the average radiation breadth have been determiner, and how, outside of such limits, the quality and the economic merit of the transverse stretching process substantially deteriorates.

In the instant example, experiments were performed in the same manner as in Example 1. The average radiation breadth was fixed at 50 mm. and the conditions prevailing during preheating were varied while at the same time the capacity of the infra-red ray heater was adjusted so that the stretching temperature was kept constant at 155° C. The results are shown in FIG. 12, in which the abscissa $\Delta T$ (° C.) represents the values obtained by deducting the preheating temperature from the stretching temperature. The term preheating temperature as herein used means the temperature along the radiation marginal line, line 3–3′–3″ in FIG. 1.

Since the temperatures may not necessarily be uniform, the values of $\Delta T$ used were the average values for the whole area. As can be seen from FIG. 12, when $\Delta T$ was above 10° C., the degree of unevenness did not change, but at 7° C., it began to vary and at 5° C., the degree of unevenness increased considerably. At a temperature differential of 3° C., uniform stretching was impossible. The relationship illustrated in FIG. 12 varies slightly with a change in the average radiation breadth, But where $\Delta T$ is within a range of $7 \pm 3°$ C., there is always a bending point such as can be seen in FIG. 12.

It has been found that even if effort is made to lower the mass speed and decrease the average radiation breadth, uniform stretching of the film is infeasible when ΔT is below 4° C.

*Example 6*

Polypropylene of 98% isotacticity, obtained by an ether and n-heptane extraction process and having an intrinsic viscosity of 2.5 at 135° C. when dissolved in tetralin, was melted, extruded, and cooled. The resulting film was stretched to 4 times its original size in the extrusion direction to have a thickness of 100 microns and a breadth of 500 mm. and was then stretched to 4 times its original size in the transverse direction by means of a heater in a manner as shown in FIG. 1. There was obtained a biaxially stretched film having a thickness of 25 microns and a breadth of 2000 mm. The capacity of the infra-red ray heater used in both preheating and stretching operations was 20 kw. The heater used in the stretching operation was so designed that it could heat the film surface effectively in a small zone by the aid of a reflection plate as shown in FIG. 3.

The heater used for the preheating had a generally similar construction, but differed in that the heat was disseminated over a fairly larger area.

The radiation blocking slits shown in FIG. 3 were made so as not to reserve heat in the water-cooling apparatus. Along the longitudinal direction of the line 1–1′–1″ of FIG. 11, they were arranged without intervals in a multiplicity of rows each comprising rectangular 2 cm.-long slits. By means of an attached adjustment screw, the distance between opposing slits could be freely adjusted. The slit gaps of the infra-red ray heater used in the stretching operation were varied depending on the location. In a preliminary experiment with only the infra-red ray heater for the stretching operation, the radiation marginal line 3–3′–3″ on the film-feeding side was located. Then, the preheating heater was switched on and the film was passed through the stretching zone, wherein it was stretched, and the temperature of the film at points on the radiation marginal line on the supply side was varied and measured. The results obtained are given in Table 1.

TABLE 1.—INFLUENCE OF VARIATIONS IN TEMPERATURE OF RADIATION MARGINAL LINE UPON PERCENTAGE UNEVENNESS

| Sample No. | Temperature (° C.) Location | | | Unevenness of stretched film (percent) | Remarks |
|---|---|---|---|---|---|
| | (3′) | (Q) | (R) | | |
| 1 | 135 | 135 | 135 | 290 | |
| 2 | 135 | 130 | 128 | 28 | |
| 3 | 135 | 115 | 95 | 8 | |
| 4 | 125 | 105 | 85 | 9 | |
| 5 | 125 | 125 | 125 | 248 | |
| 6 | 135 | 145 | 145 | >350 | Broken by uneven stretching. |
| 7 | 125 | 135 | 145 | >350 | Do. |
| 8 | 145 | 125 | 115 | 18 | |
| 9 | 125 | 123 | 121 | 37 | |

In Table 1, Sample No. 1 was stretched while the entire surface of the film was uniformly heated. It will be noted that the unevenness of the film is as high as 290%. For Samples Nos. 3 and 4, the temperature difference between the locations 3′ and R was set at 40° C. As the result, the unevenness decreased remarkably to 8–9%. Sample No. 9 shows a temperature difference of 4° C. In this case, the percentage unevenness was 37%, which is permissible for some applications for the product.

*Example 7*

Polypropylene of 98% isotacticity, obtained by an ether and n-heptene extraction process and having an intrinsic viscosity of 2.5 at 135° C. when dissolved in tetralin, was melted, extruded, and cooled. The resulting film was stretched to 4 times its original size in the extrusion direction to have a thickness of 100 microns and a breadth of 500 mm. and was then stretched to 4 times its original size in the transverse direction in a manner as shown in FIG. 1 by means of a 20-kw. heater of the construction as illustrated in FIG. 3. There was obtained a film stretched biaxially to have a thickness of 25 microns and a breadth of 2000 mm.

Experiment was performed using an infra-red ray heater arranged along the line 1–1′–1″ with a slit gap first set at 50 mm. The unevenness of stretch was great. The results where the slit gap of each part was changed is shown in Table 2, locations H, I, and J corresponding to the locations H, I, and J in FIG. 1.

The total average of the slit gaps each having a length of 2 cm. was used as the average.

The experiment was performed by uniformly preheating the film with hot air at a temperature of 135° C. before the film arrived at the radiation marginal line on the feeding side.

As can be seen from the "unevenness percent" column of Table 2, it was found that the percentage of unevenness decreased as the radiation breadth (slit gaps) became narrower in the order of H→I→J. The variation of the slit gay between H→I→J can be varied not only in linear fashion but in many different ways as well.

The dissemination of amounts of heat per each slit zone was examined in the manner of the previously described preliminary experiment. In this case, the amount of heat actually given to the film per unit length of the infra-red ray heater and the slit gap were approximately proportional.

TABLE 2.—EXPERIMENTS WITH RADIATION BREADTH VARIED IN THE LONGITUDINAL DIRECTION OF RADIATION AREA

| Sample No. | Avg. Slit Gap, mm. | Slit Gap, mm. Location | | | Unevenness, percent |
|---|---|---|---|---|---|
| | | H | I | J | |
| 1 | 50 | 50 | 50 | 50 | 78 |
| 2 | 50 | 52 | 50 | 48 | 38 |
| 3 | 50 | 48 | 50 | 52 | *A 250 |
| 4 | 50 | 56 | 50 | 44 | 11 |
| 5 | 50 | 44 | 50 | 56 | *B >250 |
| 6 | 50 | 65 | 50 | 35 | 10 |
| 7 | 50 | 70 | 50 | 30 | 8 |
| 8 | 50 | 75 | 50 | 25 | 9 |
| 9 | 50 | 80 | 50 | 20 | 8 |
| 10 | 50 | 85 | 50 | 15 | 10 |
| 11 | 50 | 90 | 50 | 10 | *C 18 |
| 12 | 80 | 80 | 80 | 80 | 97 |
| 13 | 80 | 85 | 80 | 75 | 32 |
| 14 | 80 | 75 | 80 | 85 | *D 280 |
| 15 | 80 | 120 | 80 | 40 | 8 |

Remarks:
*A = Film broke due to uneven stretching.
*B = Stretching impossible.
*C = About 10% differential of strength and elongation between both ends and the middle. But no problem for practical use.
*D = Film broke due to uneven stretching.

In Sample No. 11 of Table 2, the unevenness is rather remarkable. The strength, elongation, and other physical properties of the stretched film were examined at both ends and in the middle thereof, and it was found that a differential of about 10% existed. This is a range which is sufficiently allowable for industrial use. In this case, the variation rate of the amount of heat was 160% and this is considered to be the limit when the average slit gap, as in Table 2, is 50 mm. This value varies depending on the production conditions employed.

This marginal value being very large, it is possible to establish favorable operating conditions with practically no problem in industrial operation if the variation rate is set at 10% or, wherever possible, at more than 20%.

*Example 8*

Figures 6, 7:
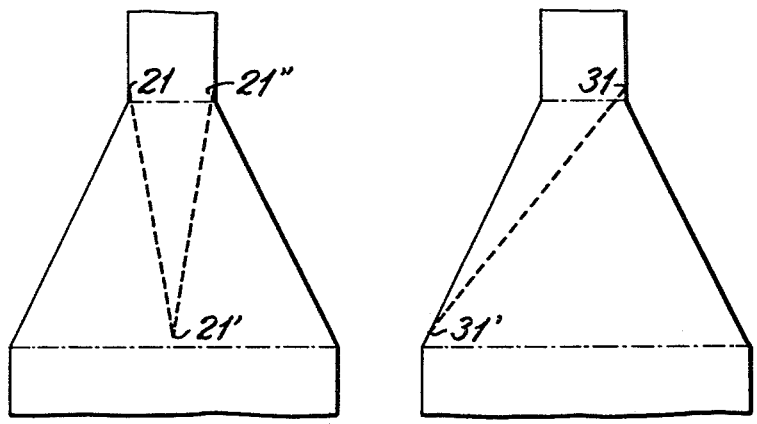
FIGS. 6 and 7 are schematic plan views illustrating alternative arrangements to that shown in FIG. 1.

Experiments were conducted in a similar manner to Example 7 with the heaters arranged as shown in FIGS. 6 and 7. Results similar to those given in Table 2 were obtained. In FIGS. 6 and 7, infra-red ray heaters are represented by numerals 21–21′–21″ and 31–31′.

*Example 9*

The experiments described in the foregoing examples were repeated with low-density polyethylene, which was a substance of a similar nature, mixed in an amount of 5% by weight in the polypropylene. The film was stretched under the same conditions, but the resulting film was almost not distinguishable from the product which consisted solely of polypropylene.

What is claimed is:

1. In a process for stretching a polypropylene film in the transverse direction by subjecting it to localized irradiation with heat rays in a radiation area after preheating the film, the improvements which comprise maintaining an average radiation breadth for the radiation area approximately between 10 mm. and 200 mm. and an average temperature of the film inside the radiation area approximately 7° C. higher than the average temperature of the film prior to entering the radiation area, said radiation area being bounded on the film-feeding side by a radiation marginal line along which the temperature is decreased to the extent that the film temperature to the forwardmost longitudinal point on said radiation marginal line is more than 4° C. greater than the film temperature at the most rearward point on the radiation marginal line.

2. In a process for stretching a polypropylene film in the transverse direction by subjecting it to localized irradiation with heat rays in a radiation area after preheating the film, the improvements which comprise maintaining an average radiation breath for the radiation area approximately between 10 mm. and 200 mm. and an average temperature of the film inside the radiation area approximately 7° C. higher than the average temperature of the film prior to entering the radiation area, said film receiving an amount of heat which decreases along the length of the radiation area to the extent that the amount of heat absorbed by the film at the forwardmost part of the said radiation area is at least 10% greater than the amount of heat absorbed at the rearwardmost part.

References Cited

UNITED STATES PATENTS 3,284,551  11/1966  Yumoto et al. _____ 264—210 X

FOREIGN PATENTS 544,279  7/1957  Canada.
887,346  1/1962  Great Britain.

JAMES A. SEIDLECK, *Primary Examiner.*

J. H. WOO, *Assistant Examiner.*